(12) United States Patent
Van Nieuwenhuyze et al.

(10) Patent No.: US 12,418,600 B2
(45) Date of Patent: Sep. 16, 2025

(54) SECURE ELEMENT AND METHOD

(71) Applicants: STMicroelectronics (Rousset) SAS, Rousset (FR); STMicroelectronics Belgium, Diegem (BE)

(72) Inventors: Olivier Van Nieuwenhuyze, Wezembeek-Oppem (BE); Alexandre Charles, Auriol (FR)

(73) Assignees: STMicroelectronics Belgium, Diegem (BE); STMicroelectronics (Rousset) SAS, Rousset (FR)

( * ) Notice: Subject to any disclaimer, the term of this patent is extended or adjusted under 35 U.S.C. 154(b) by 187 days.

(21) Appl. No.: 17/487,580

(22) Filed: Sep. 28, 2021

(65) Prior Publication Data

US 2022/0131837 A1 Apr. 28, 2022

(30) Foreign Application Priority Data

Oct. 27, 2020 (FR) .................................... 2010974

(51) Int. Cl.
*H04L 69/08* (2022.01)
*G06F 21/85* (2013.01)
*H04L 67/565* (2022.01)

(52) U.S. Cl.
CPC .............. *H04L 69/08* (2013.01); *G06F 21/85* (2013.01); *H04L 67/565* (2022.05)

(58) Field of Classification Search
None
See application file for complete search history.

(56) References Cited

U.S. PATENT DOCUMENTS

| 7,012,893 | B2 | 3/2006 | Bahadiroglu |
| 7,188,191 | B1 * | 3/2007 | Hovell ................... H04L 69/16 709/230 |
| 7,500,047 | B1 | 3/2009 | Tyndall et al. |
| 9,088,433 | B2 | 7/2015 | Roettgermann et al. |
| 9,338,059 | B1 | 5/2016 | Ainsworth et al. |
| 11,303,745 | B2 | 4/2022 | Van Nieuwenhuyze |

(Continued)

FOREIGN PATENT DOCUMENTS

| CN | 101023420 A | 8/2007 |
| CN | 102687123 A | 9/2012 |

(Continued)

OTHER PUBLICATIONS

Globalplatform Technology, "Virtual Primary Platform—Network Protocol Version 1.0.1", Document Reference GPC_FST_140, Oct. 2018, 74 pages.

(Continued)

*Primary Examiner* — Tonia L Dollinger
*Assistant Examiner* — Ishrat Rashid
(74) *Attorney, Agent, or Firm* — Slater Matsil, LLP

(57) ABSTRACT

The present description discloses a secure element and a communication method comprising at least one operating system including at least one application having a register associated therewith, a buffer memory, and a router having a software layer. The software layer is configured to directing first messages using a first protocol and intended for the application to the buffer memory, and directing second messages using a second protocol different from the first protocol and intended for the application to the register.

24 Claims, 5 Drawing Sheets

(56) References Cited

U.S. PATENT DOCUMENTS

| | | | |
|---|---|---|---|
| 2002/0194389 A1 | 12/2002 | Worley | |
| 2006/0106941 A1* | 5/2006 | Singhal | H04L 67/56 709/245 |
| 2010/0274712 A1* | 10/2010 | Mestre | G06Q 20/341 726/30 |
| 2012/0042157 A1 | 2/2012 | Leclercq | |
| 2012/0150601 A1* | 6/2012 | Fisher | H04B 5/70 705/14.23 |
| 2014/0020114 A1 | 1/2014 | Bhatia | |
| 2015/0111495 A1* | 4/2015 | Van Nieuwenhuyze | H04W 4/80 455/41.1 |
| 2015/0271677 A1 | 9/2015 | Van Nieuwenhuyze et al. | |
| 2016/0142109 A1* | 5/2016 | Kumar | H04B 5/266 455/41.1 |
| 2016/0309285 A1 | 10/2016 | Charles | |
| 2017/0055109 A1 | 2/2017 | Van Nieuwenhuyze et al. | |
| 2017/0329921 A1 | 11/2017 | Willard et al. | |
| 2018/0376333 A1* | 12/2018 | Chen | H04L 69/08 |
| 2019/0005284 A1* | 1/2019 | Hueber | H04B 5/72 |
| 2019/0197267 A1* | 6/2019 | Stoilov | G06K 7/10386 |
| 2020/0279059 A1* | 9/2020 | Courtiade | G06F 21/77 |

FOREIGN PATENT DOCUMENTS

| | | | |
|---|---|---|---|
| CN | 104936129 A | 9/2015 | |
| CN | 106060759 A | 10/2016 | |
| CN | 106470049 A | 3/2017 | |
| CN | 211509119 U | 9/2020 | |
| CN | 104115175 A | 10/2021 | |
| FR | 3090947 A1 | 6/2020 | |
| JP | 6517926 B2 * | 5/2019 | G06F 21/57 |

OTHER PUBLICATIONS

U.S. Appl. No. 17/484,308, filed Sep. 24, 2021.
U.S. Appl. No. 17/484,246, filed Sep. 24, 2021.

* cited by examiner

SECURE ELEMENT AND METHOD

CROSS-REFERENCE TO RELATED APPLICATIONS

This application claims the benefit of French Patent Application No. 2010974, filed on Oct. 27, 2020, which application is hereby incorporated herein by reference.

TECHNICAL FIELD

The present disclosure generally is related to electronic devices, and more particularly to electronic devices adapted to processing secret data. More particularly, the present disclosure is related to communication of a secure element with other electronic devices.

BACKGROUND

There exist more and more electronic devices adapted to providing digital services. These digital signals use cryptographic mechanisms where it is necessary to protect the secret data which have a high importance. The integrity of the content is also very important, indeed, conversely to a cipher (or signature) key, an identification number should not be able to be modified but it is freely accessible. For this purpose, it is up to electronic devices to guarantee the confidentiality and the integrity of the data.

A secure element is an electronic device, autonomous or not, adapted to processing secret data in secure fashion, that is, without for these secret data to be accessible or deduced, for example, by side channel attacks or penetration. A secure element may be configured to cipher data, for example.

It would be desirable to be able to improve, at least partly, certain aspects of the communication between a secure element and other electronic devices.

SUMMARY

There is a need for secure elements adapted to efficiently communicating with other electronic devices.

An embodiment overcomes all or part of the disadvantages of known secure elements.

An embodiment of a first aspect provides a secure element comprising at least one operating system comprising at least one application having a register associated therewith; a buffer memory; and a router having a software layer adapted to directing first messages using a first protocol and intended for the application to the buffer memory; and directing second messages using a second protocol different from the first protocol and intended for the application to the register.

An embodiment of the first aspect provides a method of communication between an electronic device and a secure element comprising at least one operating system comprising at least one application having a register, a buffer memory and a router associated therewith, the router implementing a software layer comprising directing first messages using a first protocol and intended for the application to the buffer memory; and directing second messages using a second protocol different from the first protocol and intended for the application to the register.

According to an embodiment of the first aspect, the first protocol is implemented by a device external to the second element.

According to an embodiment of the first aspect, the first protocol is the VNP protocol defined according to the Global Platform Technology—Virtual Primary Platform—Network Protocol 1.0.1 or subsequent standard.

According to an embodiment of the first aspect, the second protocol is selected from the group comprising the HCI protocol, the SWP protocol, the CLT protocol, the packet communication protocol defined by the ISO7816 standard, the sHDLC protocol, and a communication protocol using an internal timing memory.

According to an embodiment of the first aspect, the first and second messages are formed of data packets of a packet communication method.

According to an embodiment of the first aspect, the software layer is adapted to modifying headers of the data packets of the second messages.

According to an embodiment of the first aspect, the second messages originate from a near-field communication device.

According to an embodiment of the first aspect, the first and second messages are intended for applications adapted to being implemented by a high-level operating system of the secure element.

According to an embodiment of the first aspect, the element is adapted to implementing at least two applications.

According to an embodiment of the first aspect, the element or the method is adapted to directing the second messages to the application among the at least two applications for which the second messages are intended.

According to an embodiment of the first aspect, the software layer manages a list of patterns provided by the applications allowing the routing of the protocol.

According to an embodiment of the first aspect, the secure element is embedded in an electronic system.

According to an embodiment of the first aspect, the secure element is integrated in an electronic system.

An embodiment of a second aspect provides a secure element comprising a router managing first messages using a first communication protocol between applications of the secure element and the outside of the secure element; and a software layer performing a processing at the level of the router and adapted to verifying the compatibility of a second communication protocol, different from the first one, with which second messages are received; in the absence of a compatibility, converting the second messages into the first communication protocol; and transmitting the second messages to the router.

An embodiment of the second aspect provides a method of communication between a secure element and the outside of the secure element, the secure element comprising a router managing first messages using a first communication protocol between applications of the secure element and the outside, the method comprising, executed by a software layer at the level of the router, of verifying the compatibility of a second communication protocol, different from the first one, with which second messages are received; in the absence of a compatibility, converting the second messages into the first communication protocol; and transmitting the second messages to the router.

According to an embodiment of the second aspect, the software layer is a virtual destination host for the applications.

According to an embodiment of the second aspect, the first protocol is implemented by a device external to the secure element.

According to an embodiment of the second aspect, the first protocol is the VNP protocol defined according to the Global Platform Technology—Virtual Primary Platform—Network Protocol 1.0.1 or subsequent standard.

According to an embodiment of the second aspect, the second protocol is selected from the group comprising the HCI protocol, the SWP protocol, the CLT protocol, the packet communication protocol defined by the ISO7816 standard, the sHDLC protocol, and a communication protocol using an internal timing memory.

According to an embodiment of the second aspect, the first and second messages are formed of data packets of a packet communication method.

According to an embodiment of the second aspect, the software layer is adapted to modifying headers of the data packets of the second messages.

According to an embodiment of the second aspect, the second messages originate from a near-field communication device.

According to an embodiment of the second aspect, the first and second messages are intended for applications adapted to being implemented by a high-level operating system of the second element.

According to an embodiment of the second aspect, the element is adapted to implementing at least two applications.

According to an embodiment of the second aspect, the software layer is further adapted to directing the second messages to the application among the at least two applications for which the second messages are intended.

According to an embodiment of the second aspect, the software layer has a routing table enabling to convert a message intended for a given application.

According to an embodiment of the second aspect, the software layer uses an injective function enabling to convert a message intended for a given application.

According to an embodiment of the second aspect, the software layer informs a device distinct from the secure element of the presence of an additional application during the creation of a pipe towards this same software layer.

According to an embodiment of the second aspect, the secure element is embedded in an electronic system.

According to an embodiment of the second aspect, the secure element is integrated in an electronic system.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
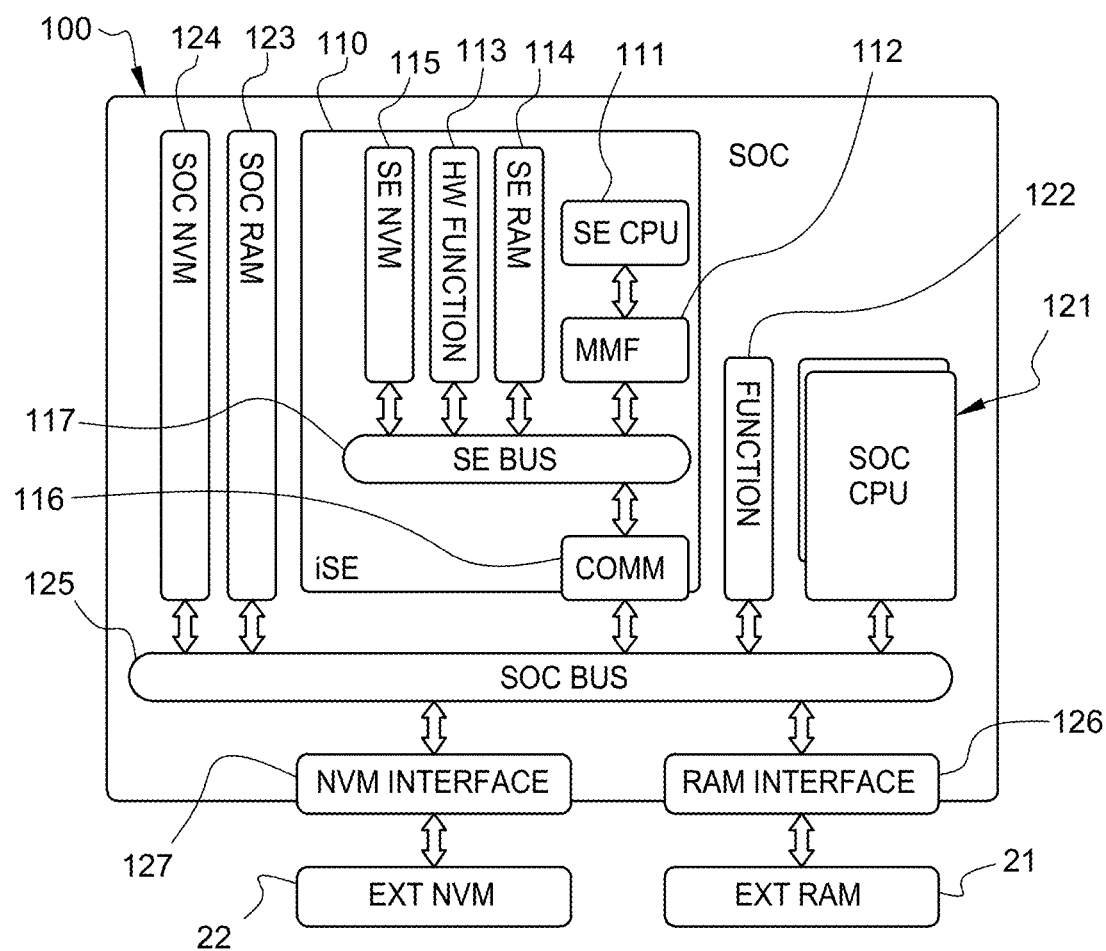
FIG. 1 schematically shows, in the form of blocks, an example of an electronic device of the type to which the described embodiments apply.

FIG. 1 schematically shows, in the form of blocks, an example of an electronic device too (SOC) of the type to which the described embodiments apply.

Device too is an electronic device formed on one and the same chip (System On Chip—SOC). Device too comprises a secure element 110 which, in this example, is integrated (iSE—integrated Secure Element). Secure element 110 is a secure element integrated in device too, that is, which may have an autonomous operation in device too. According to an alternative embodiment, secure element 110 uses certain hardware resources of device too to operate, such as memories, circuits implementing specific functionalities, etc.

Integrated secure element 110 is an electronic circuit manipulating secret data which are, for example, ciphered. Secure element 110 comprises at least one processor 111 (SE CPU) adapted to processing secret data; a memory management function 112 (MMF) and/or a memory management unit (MMU) (not shown), capable of managing the reading and the writing of data from and into the memories; one or a plurality of circuits 113 (HW FUNCTION) adapted to implementing hardware functionalities (for example, a cryptographic accelerator, a communication cell, etc.) of secure element 110; at least one volatile memory 114 (SE RAM); at least one non-volatile memory 115 (SE NVM); a communication circuit 116 (COMM) adapted to managing transmissions of data and control signals between secure element 110 and the rest of device too; and a communication bus 117 (SE BUS) coupling all the elements of secure element 110.

As a variant, integrated secure element 110 is connected to one or a plurality of additional communication buses. For example, the integrated secure element may have a bus according to the ISO7816 standard, connected with a modem of system-on-chip too, another SWP-type (Single Wire Protocol) bus connected to a near-field communication device (NFC).

Processor 111 is used to process control signals and data originating from memories 114 and 115, or other memories comprised within device too. Processor 111 uses memory management circuit 112 as an intermediary to manage the memory storage of the data and of the control signals, and thus the processor never directly has access to memories 114 and 115. As an example, circuit 112 may for example be used to allocate memory spaces of a volatile memory or of a non-volatile memory to certain applications implemented by the integrated secure element.

Circuits 113 may comprise a multitude of types of circuits and of components, functions enabling to copy data to external memories, cryptographic coprocessors, etc.

Communication circuit 116 may be used as a data receive and transmit chain for secure element 110. Circuit 116 may comprise data reception circuits, data ciphering and/or deciphering circuits, one or a plurality of routers, data conversion circuits. Device too may comprise secure element no only, but may also further optionally comprise one or a plurality of processors 121 (SOC CPU) adapted to processing data; one or a plurality of circuits 122 (FUNCTION) adapted to implementing different functionalities of device too; one or a plurality of volatile memories 123 (SOC RAM); one or a plurality of non-volatile memories 124 (SOC NVM); and a communication bus 125 (SOC BUS) enabling to exchange and to transmit control signals and data to all the previously-mentioned elements.

For bulk and compactness reasons, device too may further be adapted to storing data into one or a plurality of external memories. More particularly, device too may be adapted to storing data into an external volatile memory 21 (EXT RAM) and/or into an external non-volatile memory 22 (EXT NVM). In this case, device too further comprises interface circuits adapted to communicating with the external memories. More particularly, device too may comprise, in this case, an interface circuit 126 (RAM INTERFACE) adapted to communicating with external volatile memory 21, and/or an interface circuit 127 (NVM INTERFACE) capable of communicating with non-volatile memory 22.

Secure element 110 may have access to the hardware resources of device too to operate, such as for example to circuits 122, to memories 123, 124, or even to memories 21 and 22.

Figure 2:
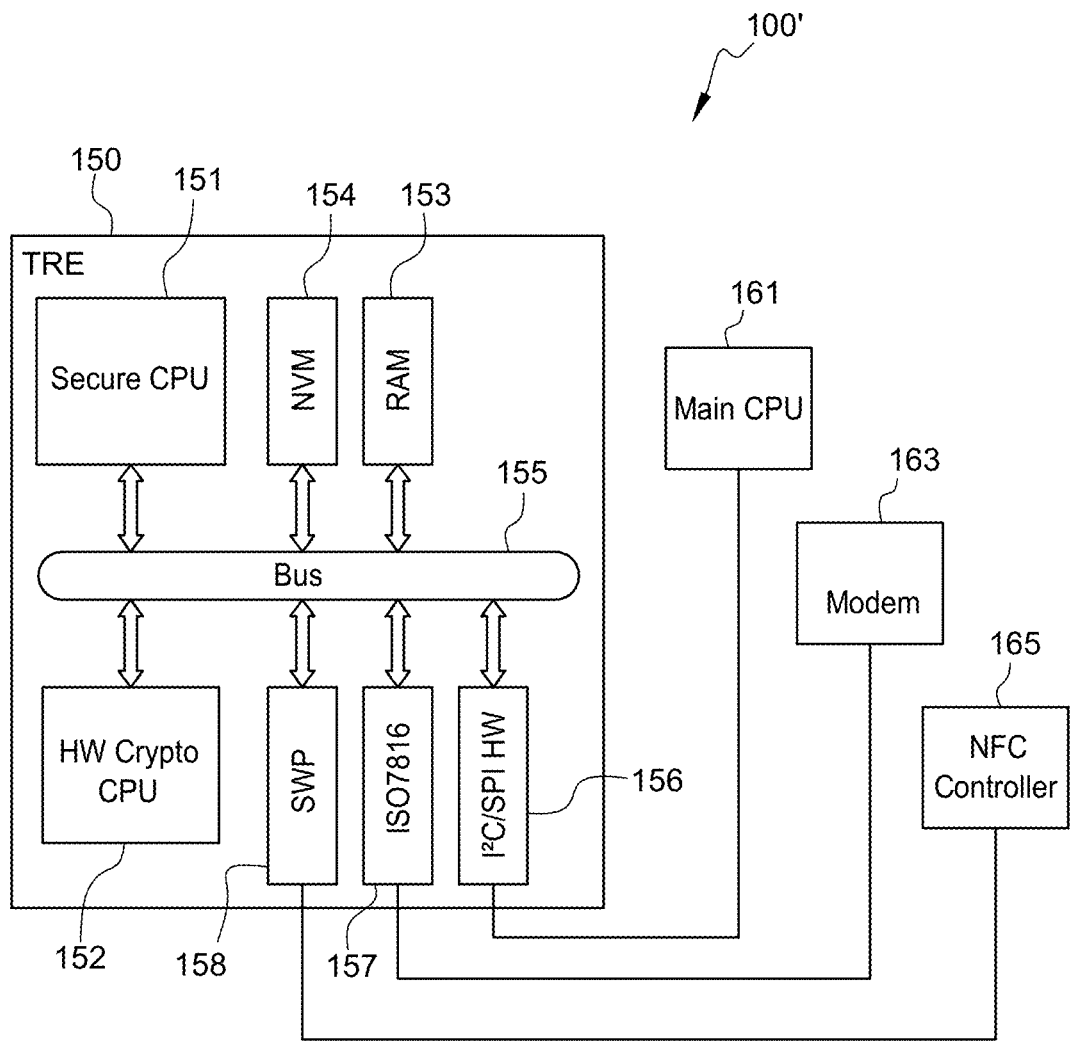
FIG. 2 schematically shows, in the form of blocks, another example of an electronic device of the type to which the described embodiments apply.

FIG. 2 schematically shows, in the form of blocks, another example of an electronic circuit 100' of the type to which the described embodiments apply.

Device 100' comprises various electronic circuits or chips among which an embedded Secure Element (eSE) 150 forming a tamper resistant element (TRE); a main processor 161 (Main CPU); a modem-type communication circuit 163 (Modem); and a near-field communication circuit 165 (NFC controller).

Embedded secure element 150 is formed of a single chip and integrates, for example, a secure element 151 (Secure CPU); a hardware cryptographic processor 152 (HW Crypto CPU) or cryptographic accelerator; one or a plurality of volatile memories 153 (RAM); one or a plurality of non-volatile memories 154 (NVM); and one or a plurality of buses 155 (Bus) of communication between the different components of element 150.

Element 150 further integrates interfaces of communication with the outside according to various communication protocols, for example, an interface 156 (I2C/SPI HW) of I2C or SPI type of communication with external processor 161; an interface 157 (ISO7816) of communication according to the ISO7816 standard with modem 163; and an SWP-type interface 158 (SWP) of communication with NFC controller 165.

Device 100' may comprise other circuits, integrated or not. For example, embedded secure element 150 may use one or a plurality of external memories (not shown) with which it communicates directly or via the main processor.

Conversely to an integrated secure element such as the element 110 of FIG. 1, an embedded secure element 150 is not integrated with the other components of device 100' and particularly the main processor of the application.

Embedded secure element 150 may however be integrated with a near-field communication controller (NFC).

Figure 3:
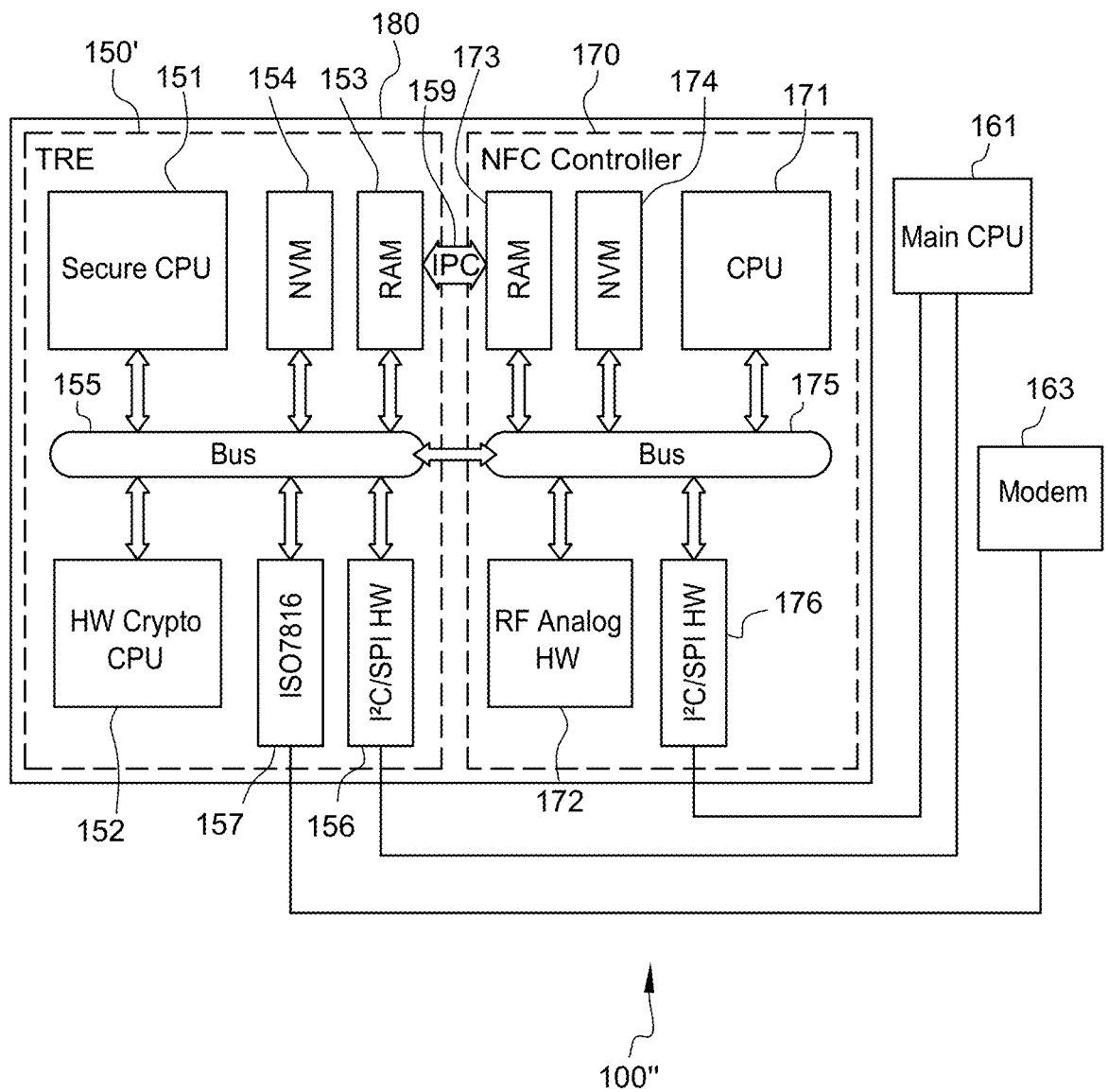
FIG. 3 schematically shows, in the form of blocks, still another example of an electronic device of the type to which the described embodiments apply.

FIG. 3 schematically shows, in the form of blocks, still another example of an electronic circuit 100" of the type to which the described embodiments apply.

In this example, it is assumed that the embedded secure element is integrated with a near-field communication controller on a same chip 180. Thus, integrated circuit or chip 180 comprises an embedded secure element 150' (TRE) including the same elements as the element 150 of FIG. 2 except for interface 158, that is, a secure element 151 (Secure CPU); a hardware cryptographic processor 152 (HW Crypto CPU); one or a plurality of volatile memories 153 (RAM); one or a plurality of non-volatile memories 154 (NVM); one or a plurality of buses 155 (Bus) of communication between the different components of element 150; an interface 156 (I2C/SPI HW) of I2C or SPI type of communication with external processor 161 (Main CPU); and an interface 157 (ISO7816) of communication according to the ISO7816 standard with modem 163 (Modem); and a NFC controller 170 (NFC Controller) including, for example, a processor 171 (CPU); a radio frequency transmit/receive circuit 172 (RF Analog HW) or RF analog head; one or a plurality of volatile memories 173 (RAM); one or a plurality of non-volatile memories 174 (NVM); one or a plurality of buses 175 (Bus) of communication between the different components of the NFC controller; and an interface 176 (I2C/SPI HW) of communication with the main processor 161 of device 100".

The exchanges between secure element 150' and controller 170 directly transit through buses 155 and 175 which, according to cases, are coupled together and form one and the same bus, where element 150' and controller 170 may simulate a SWP protocol.

Secure element 150' and the controller may also communicate via their RAMs 153 and 173 via a shared memory 159 allowing the communication between processes (IPC—Inter Process Communication).

As a variant, secure element 150' and the controller may communicate via their internal SWP communication cells (not shown). This enables to keep the format of SWP exchanges (and of the protocols implemented thereon) without having the constraints (such as the noise, the bus speed limitation, etc.).

The application to near-field communications between a secure element (integrated or embedded) is a preferred application due to the strong development of these functionalities in the electronic devices.

Figure 4:
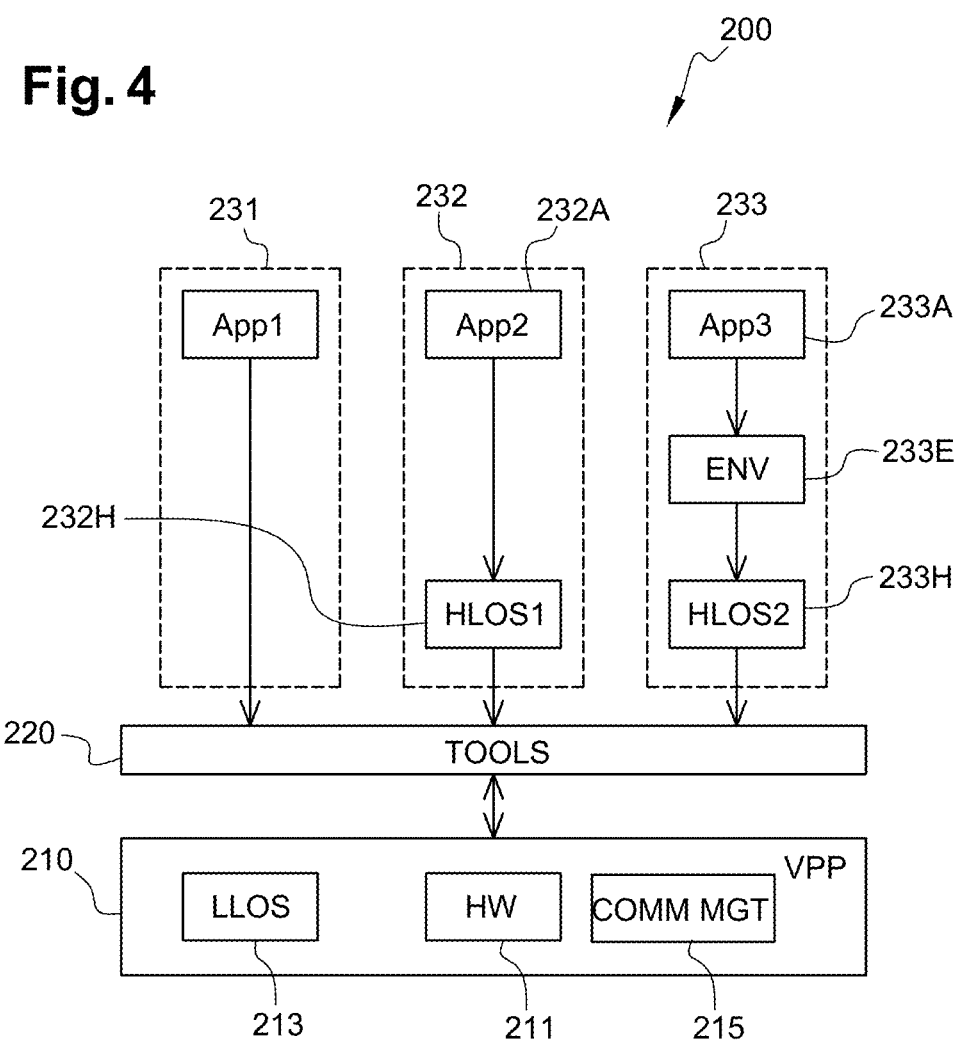
FIG. 4 schematically shows in the form of blocks an embodiment of a software architecture of a secure element of an electronic device of the type of those described in relation with FIGS. 1 to 3.

FIG. 4 schematically shows in the form of blocks an embodiment of a software architecture 200 of a secure element of an electronic device of the type of those described in relation with FIGS. 1 to 3.

Unless specified otherwise, the expression "secure element" designates hereafter indifferently an embedded secure element or an integrated secure element. Thus, the software architecture 200 of secure element SE may be implemented in any of the elements 110, 150, or 150' of the previous drawings.

Architecture 200 comprises a primary platform 210 (VPP), generally called virtual primary platform (VPP) comprising the access to the electronic components 211 (HW) of secure element SE and comprising one or a plurality of low-level operating systems 213 (LLOS). According to an embodiment, primary platform 210 further comprises a circuit capable of implementing a communication management software or process 215 (COMM MGT) having its operation described in relation with FIG. 5.

Components 211 are the hardware resources of secure element SE (110, FIG. 1; 150, FIG. 2; 150', FIG. 3). The components 211 of secure element 110 are for example one or a plurality of processors, for example, processor 111 (FIG. 1) or 151 (FIGS. 2 and 3), one or a plurality of memories, for example, memories 114 and 115 (FIG. 1) or 153 and 154 (FIGS. 2 and 3), one or a plurality of communication devices, such as a communication device enabling to directly communicate with a near-field communication device (NFC), a short-range communication device using, for example, the Bluetooth standard, biometric sensors, etc.

Low-level operating systems 213 are software adapted to implementing components 211 to execute control signals received from most of the applications implemented by the secure element. As an example, low-level operating systems 213 comprise all or part of the driver software of components 211.

A low-level operating system 213 is formed of an execution code (or executable code) and of execution data. The execution code contains instructions enabling to execute functions of the program. By definition, the instructions are invariable for a given program, except for an update of the program, which then modifies the instructions. The execution data are used by the execution code to contextualize the execution and perform the desired function. The execution data may be distributed in two categories. So-called "temporary" execution data and so-called "permanent" or "fixed" execution data. For example, if the function comprises the verification of a PIN code, this function is broken down in three portions, the execution code contains instructions of verification of the PIN code while the permanent execution data contain the reference PIN code and the number of remaining tests and the temporary execution data contain the PIN code submitted to the verification.

Primary platform 210 communicates with applications implemented by secure element 110 with interfaces or tools 220 (TOOLS) executed by the primary platform. These interfaces or tools 200 may comprise, among others, application binary interfaces (ABI); registers (VRE, Virtual Register); and storage buffer memories, or buffer memories, or also shared memories allowing a data exchange between processes via inter-process communications (IPC).

An application binary interface is a low-level interface between the applications of the secure element and its operating system, or between different portions of an application.

The registers are memory spaces linked to a hardware function of the secure element and used to temporarily store data, for example, when a control signal is sent to the primary platform 210 of the secure element or during exchanges between processes executed by the primary platform.

The buffer memories (or shared memories) are used to store messages before their use by platform 210 or by applications 231, 232, 233 of the secure element. In practice, buffer memories are memory spaces allocated in a memory of element no, for example, a volatile memory to which element no has access, such as memory 114.

As an example, software architecture 200 comprises at least three applications 231, 232, 233 adapted to using interfaces or tools 220 to implement primary platform 210. Applications 231, 232, 233 are software using the resources of the primary platform. Of course, the secure element implements a number of applications within the limit of its calculation capacities.

An integrated secure element 110 (FIG. 1) could execute a single application at a time in its internal memories and record the other applications in external memories, which would enable to have a number of applications only limited by the external memories. The application must previously be loaded into the inner memories before being executed (or resuming the execution) and the previous application must be discharged before being able to use it. Conversely, an embedded secure element 150 (FIG. 2) or 150' (FIG. 3) will prefer the use of its internal memories to store and execute the applications, which implies a more limited notion of applications, but a faster execution since it will be spoken of an "in place" execution which does not require displacing the application. It however remains possible to combine an embedded secure element with external memories and thus to combine the benefit of the internal and external memories. Applications 231, 232, 233 may be adapted to implementing any type of functionalities. They generally implement digital services of a service provider, for example, a payment service of EMV or transport ticket type. These applications may be combined with another application located in main processor 121 (FIG. 1) or 161 (FIGS. 2 and 3) or in another secure environment (Trusted Execution Environment). The processor and the secure environment are more capable of interacting with the user via a trusted user interface. Applications 231, 232, 233 are for example adapted to processing control signals originating from communication interfaces, such as, for example, a bank transaction using a near-field communication device. The applications may be of different types, for example, a SIM (Subscriber Identity Module) application, a payment application, an application enabling to validate a public transport ticket, etc.

According to an example of application type, application 231 (App1) is capable of being directly implemented by primary platform 210 (VPP) by means of interfaces or tools 220. Application 231 is for example an application enabling to make payments by communicating with a near-field communication (NFC) device.

According to another example of application type, application 232 is a set of instructions 232A (App2) adapted to being executed by using a high-level operating system 232H (HLOS1). A high-level operating system is software adapted to implementing different applications by providing a set of common software functions. Operating system 232H is the only portion of application 232 to be communicating with primary platform 210 by means of interfaces or tools 220. As a variant, it can also be considered that the high-level operating system, as well as all the applications which are attached thereto, are a single application adapted to being implemented by primary platform 210 by means of interfaces or tools 220.

According to another example of application type, another application 233 is a set of instructions 233A (App3) using an execution environment 233E (ENV) which itself uses a high-level operating system 233H (HLOS2). The execution environment is for example of Java or JavaCard type. Operating system 233H and execution environment 233E are the only portions of application 233 to communicate with primary platform 210 by means of interfaces or tools 220. As a variant, it can also be considered that the high-level operating system, as well as all the applications which are attached thereto, are an application capable of being implemented by primary platform 210.

High-level operating systems 232H and 233H, or applications 232 and 233 themselves if there is no high-level operating system, use virtual images of the memories available for the management of the execution codes and of the execution data. Due to this technique, the high-level operating systems (or the applications) do not have a direct access to the management of physical memories, be they volatile or non-volatile. In other words, in the described embodiments, the high-level operating systems manage a virtual image of the memories. The correspondence of the physical distribution in the volatile and non-volatile memories is ensured by low-level operating system(s) 213 in combination with certain HW modules 211. More generally, it is considered that module 210 puts in correspondence the virtual and physical memories.

Further, it is considered that an application may be in at least three different states: an active state or state where it is run by primary platform 110; a standby state, that is, its execution is interrupted but it may be resumed at any moment; and an inactive or deactivated state, that is, its execution cannot be restarted without one or a plurality of prior operations.

When an application leaves the standby state to be executed again, it resumes its execution where it has stopped. It does not need using a specific routine to continue its processing. From the point of view of the application, all appears as if the application had not been interrupted.

When an application is deactivated, all its data are stored in the memory in the same way as for an application at standby.

The implementation of application 231, 232, or 233 is the following. When an application desires to use a hardware resource of the secure element, that is, one or a plurality of components 211 of primary platform 210, this means that the current operations executed on the fixed data are considered as ended. The application can then execute different control signals, for example, forcing a writing into a non-volatile memory. For this purpose, the application sends a control signal and/or data to primary platform 210 via interfaces or tools 220. The control signal is taken charge of by one or a plurality of application binary interfaces before being sent to low-level operating systems 213, that is, the control signal is divided into a plurality of operations, each represented by an application binary interface or virtual registers or also a buffer memory/shared memory. The data are stored into registers or transmitted via inter-process communications (IPC). Low-level operating systems 213 respond to the requests of the application binary interfaces by applying the operations requested by the application binary interfaces to the data stored in the registers. Low-level operating systems 213 then drive components 211 to execute what is requested by the application.

Applications 231, 232, 233 cannot communicate together within the secure element. Each application 23x (with x varying from 1 to the number of applications likely to be executed) does not know the existence of the other applications 23x. In particular, each operating system of an application "believes" that it is the only one to communicate with the outside. Thus, if the applications had to communicate together, they should do it as if they were discussing of a secure element executing an application 23x towards another element with an application 23x. However, two sub-applications of a same set or application 233 (an application may contain a plurality of sub-applications) use packet communication methods to communicate together by using the IPC inter process communication tools. Each application 231, 232, 233 may communicate with external electronic devices. Packet communication is a data transmission method where sent messages are formed of one or of a plurality of data packets. Each data packet comprises a header comprising data relative to the type of communication protocol used, to the transmitter of the message, to the message receiver, to the message size, etc. Among the different known packet communication protocols, the secure element is likely to use (compatible with) different protocols that may be classified, according to the nature of the protocol, in terms of exchanged data protocol, of application protocol, of communication protocol, of physical link. For example, these protocols include: the VNP protocol (Virtual Network Protocol) defined by the "Global Platform Technology Virtual Primary Platform—Network Protocol 1.0.1" standard (or any subsequent version) which corresponds to a protocol of the exchanged data; the SWP protocol (Single Wire Protocol), defined by the ETSITS 102 613 UICC— Contactless Front-end (CLF) Interface—Physical and data link layer characteristics standard, which corresponds to a physical link; the communication protocol defined by the ISO7816 standard which covers both the data exchange, the application protocol, the communications, and the nature of the physical link (wireless); the HCI (Host Controller Interface) protocol, defined by the ETSI TS 102 612 v12.0 standard (or any subsequent version) which corresponds to an application protocol; the CLT protocol, defined by the ETSI TS 102 613 UICC—Contactless Front-end (CLF) Interface—Physical and data link layer characteristics 11.0 standard (or any subsequent version), which corresponds to a communication protocol; the sHDLC protocol (Simplified High-Level Data Link Control), defined by the ETSI TS 102 613 (UICC—Contactless Front-end (CLF) Interface— Physical and data link layer characteristics) standard; and the I2C or SPI protocol, which correspond to physical links.

The messages may also be transmitted via a memory playing the role of a communication bus. In other words, a communication bus may be replaced with a memory having the data to be transmitted by the transmit device written into it, and read by the receive device.

The VNP protocol is a communication protocol adapted to operating for the communications of a secure element. It is a protocol capable of managing the routing of the messages within architecture 200 and also towards outer devices. This is the preferred communication protocol in a secure element. According to an embodiment, the router comprised within components 211 (in combination with low-level operating systems 213) is a router configured to process messages using the VNP protocol.

The HCI, sHDLC, and CLT protocols are protocols which are in conflict with the VNP protocol, since these protocols are not compatible, the standards do not define the interaction between the two. The result of this conflict shows that the HCI, sHDLC, and CLT protocols are not adapted to managing the routing of the messages within architecture 200. Thus, the router comprised in components 211 cannot support a message using the sHDLC, CLT, and HCI protocols since the data for properly routing the messages within architecture 200 are not present.

The CLT, sHDLC, and HCI protocols, and the protocol defined by the ISO7816 standard are protocols which are not compatible with the use of the VNP protocol. The router comprised in components 211 (in combination with 213) is not capable of supporting a message using the CLT, sHDLC, HCI, and ISO7816 protocols.

In the embodiments described hereafter, it is desired to ascertain that the secure element (integrated or embedded) manages the possible conflicts between applications while isolating the applications from one another. In other words, each operating system of an application (or each application with no operating system) believes that it is the only one to access the secure element.

Figure 5:
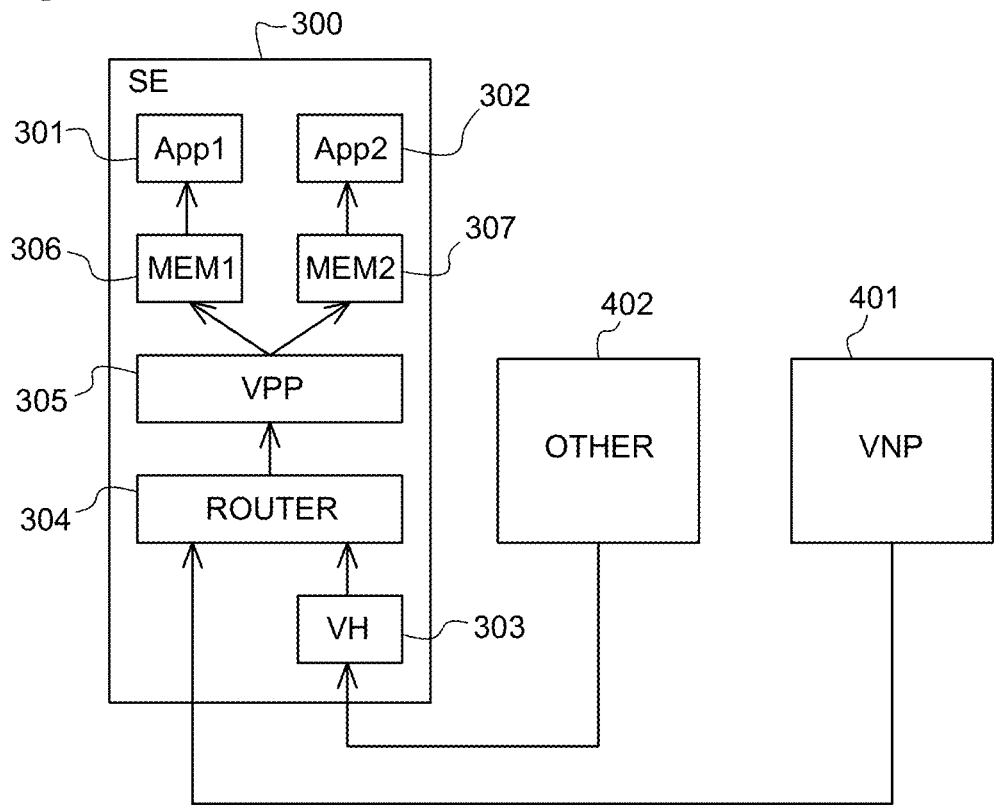
FIG. 5 very schematically shows in the form of blocks an embodiment of a communication between two electronic devices.

FIG. 5 schematically shows in the form of blocks an embodiment of a communication between two electronic devices.

FIG. 5 for example illustrates an embodiment of a communication between a secure element 300 (SE) of the type of those described in relation with the previous drawings and electronic devices 401 (VNP) compatible with the VNP protocol, for example, main processor 121 (FIG. 1) or 161 (FIGS. 2 and 3) and a device 402 (OTHER) which is not compatible with the VNP protocol, and which uses different packet communication protocols. It is for example, modem 163 (FIGS. 2 and 3) which conventionally exchanges with the secure element (for example, a subscriber identification module—SIM) via an ISO7816 protocol. Device 401, 402 may be the device having secure element 300 comprised therein (case of the integrated secure module) or a separate electronic device (case of the embedded secure module).

Device 401 is adapted to communicating with secure element 300 by sending messages using the VNP protocol.

Device 402 is adapted to communicating with secure element 300 by sending messages using other protocols than the VNP protocol, such as for example the HCI protocol, the SWP protocol, the CLT protocol, the ISO7816 protocol, the sHDLC protocol. Device 402 may for example also use an internal timing memory such as the physical link conveying the concerned protocol. Device 402 is, for example, a near-field communication device, for example, a NFC device. This type of device must implement specific standards to allow an interoperability (during its use with the different devices). More particularly, a NFC device will use a NFC controller (Near Field Communication Controller—NFCC) or a contactless front end (CLF) with the NCI protocol for the interfacing with the NFCC and the main processor and the HCI/CLT/sHDLC protocol for the interfacing between the NFCC or the CLF and the secure element.

In the example illustrated in relation with FIG. 3, secure element 300 implements two applications 301 (App1) and 302 (App2). The chain of reception of a message by secure element 300 is shown in FIG. 3. This receive chain comprises a circuit 303 (VH) adapted to implementing virtual host software; a router 304 (ROUTER) adapted to processing the received messages; the virtual primary platform 305 (VPP) of the secure element; and two buffer memories 306 (MEM1) and 307 (MEM2), each associated with an application 301, 302.

When device 401 sends a message using the VNP protocol to secure element 300, this message is received by router 304. Due to the header of the data packets of the message, router 304 is capable of determining what application should receive the message due to the data present in the VNP protocol. The message then passes through the virtual private platform to be stored in the buffer memory associated with the applicator intended to receive the message, process it, and answer thereto. The application will fetch the message from the buffer memory in order to use it.

When device 402 sends a message which does not use the VNP protocol to secure element 300, this message is first received by circuit 303 adapted to implementing the virtual host software or process. The software or process has several functionalities. It first enables to modify the communication protocol used by the message to make it usable by router 304 if this protocol is not compatible with the VNP protocol. The virtual host further enables to direct the message to the adequate application.

An example where a NFC controller uses the HCI protocol, combined with sHDLC and CLT protocols, as defined in the ETSITS 102 622 and TS 102 613 standards, is assumed. It is further assumed that applications App1 and App2 of secure element 300 only interface the VPP layer (and the router). The VPP layer and the associated router then only use the VNP protocol. First, the virtual host software will register, on the VNP router, to be seen by applications App1 and App2 as a NFC host implementing a HCI gate. When application App1 or App2 will create a VNP pipe towards this virtual host software, the virtual host software will accept the creating of the pipe and initiate the communication between itself and the NFC controller by using the defined protocols comprised by the NFC controller. Then, when application App1 or App2 will send HCI control signals to execute instructions on the NFCC via VNP packets, the virtual host software will intercept/receive the VNP packets containing the HCI control signal and will remove the VNP encapsulation to encapsulate the message in one or a plurality of sHDLC frames. During the messages coming, in return, from the NFC controller to application App1 or App2, the virtual host software will perform the operation in the reverse direction, that is, by suppressing the sHDLC data and by adding thereto the VNP data (while keeping the HCI content). This first type of implementation makes the use of this translation exclusive. In other words, two applications of two different low-level operating systems (LLSO) might not properly manage the NFCC controller. Indeed, they would rapidly become conflicting. Since each low-level operating system LLOS does not know the other low-level operating system, their respective application might otherwise introduce incompatible parameters on the NFC controller, making the applications of the other application unusable. Further, if a contactless message arrived via the antenna of the NFC controller, there would be no way to identify the application intended to process the control signal. For example, if a link already exists between application App1 and the NFC controller, the virtual host software then denies the creation of a link between application App2 and the NFC controller. Once the link with application App1 has been suppressed (for example, the task is completed or the pipe between application 1 and the virtual host software is suppressed/closed), the virtual host software authorizes the creation of the link between application App2 and the NFC controller. Hereafter, if application App1 wishes to access the NFC controller, it should re-create the link to the NFC controller once the link between application App2 and the NFC controller is over.

As a variant, the virtual host software may inform the NFC controller of the presence of a plurality of low-level operating systems LLOS (and thus of a plurality of applications App1, App2), which enables to have a plurality of links between the NFC controller and the applications. According to this variant, the virtual host software informs the NFC controller that a new low-level operating system is available when the pipe between the application of this new operating system and the virtual host software is created. During exchanges between the NFC controller and the virtual host device, the two devices add data to identify the application of the low-level operating system targeted by the control signal. To form the bridge between the two protocols (mainly when there are a plurality of applications), the virtual host software has an internal routing table allowing the translation of the data. As a variant, it uses an injective function between the identifier of the NFC controller and of the targeted application (two distinct identifiers cannot concern a same application).

Optionally, the software may further enable to modify the state of an application, for example, to switch it from an inactive, or standby, state, to an active state so that it is alert for the reception of a message. Once the message has been processed by the virtual host software, it follows the same path as a message sent by device 401. In other words, router 304 receives the message and directs it to the right application. The message then passes through the virtual private platform to be stored in the buffer memory associated with the application intended to receive the message. The application will fetch the message from the buffer memory in order to use it.

Optionally, the software may enable to manage a list of authorizations of access and data exchange between the different applications, the different environments, and/or the different operating systems, to authorize, or not, communications.

An advantage of this embodiment is that it enables to make a message using a communication protocol other than the VNP protocol usable by the secure element.

Figure 6:
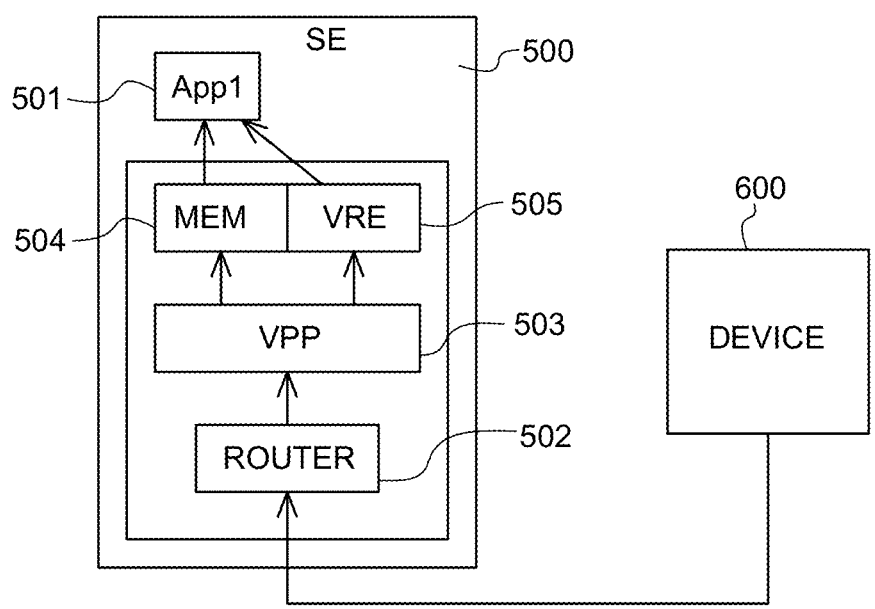
FIG. 6 very schematically shows in the form of blocks another embodiment of a communication between two electronic devices.

FIG. 6 very schematically shows in the form of blocks another embodiment of a communication between two electronic devices.

FIG. 6 schematically illustrates in the form of blocks, another embodiment of a method of communication between a secure element 500 (SE) of the type of that described in relation with the previous drawings, and an electronic device 600 (DEVICE).

Device 600 uses any packet communication protocol described in relation with FIG. 2 to communicate with the secure element. Device 600 may be the device where secure element 500 or an external electronic device is comprised. Device 600 is for example a near-field communication device.

In the example illustrated in relation with FIG. 4, secure element 500 implements an application 501 (App1). The chain of reception of a message by secure element 300 is shown in FIG. 5. This receive chain comprises a router 502 (ROUTER); the virtual primary platform 503 (VPP) of the secure element; a buffer memory 504 (MEM) associated with application 501; and a register 505 (VRE).

Router 502 is adapted to using the VNP protocol to process and direct the received messages to application 501. When device 600 sends a message using the VNP protocol, router 502 directs the message to application 501. For this purpose, the message passes through primary platform 503 and is then stored in buffer memory 504. Application 501 then fetches the message from buffer memory 504 in order to use it.

According to an embodiment, router 502 (as a variant, platform 503) is also adapted to directing the messages which do not use the VNP protocol to register 505 rather than to buffer memory 504. Register 505 is linked to application 501. Before being used, an operation of linking of the register to the application is performed. Indeed, application App1 might register on a virtual register VRE (or other means) with primary virtual primary platform 503 to indicate thereto that it may receive control signals/instructions/information according to a defined protocol (sHDLC, CLT, etc.) and/or of a physical line (SWP, I2C, SPI, ISO7816, etc.). In this implementation, a single application may register on the specific register. When data arrive on this pipe (logic or physical), the router or the VPP platform transmits the data to the application which has registered (without altering the communication protocol used).

According to an alternative embodiment, element 500 could be adapted to implement more than one application. In this case, each application is linked to a specific register by a linking operation.

In this case, the control signal is sent to the "default" application or to the currently active application. This implies that the application targeted by the control signal has been selected by other means (for example, by a channel which has used the VNP protocol). In the case of a selection by another channel, the application may request/impose its non-deselection for a given time (for example, 500 ms, 1 sec, etc.) to be able to receive and process the next control signal. If the full processing of the operation requires a plurality of control signals, the application might extend the non-deselection time by asking it to the VPP layer.

According to another alternative embodiment where element 500 is adapted to implementing more than one application, a register may be linked to the application which is being executed by secure element 110.

In this variant, the applications indicate a pattern which is specific thereto. The advantage is that if a plurality of applications register on a same virtual register, router 304 or platform 305 may select the application according to the recorded pattern. A default application may keep on executing its processing if the received control signal corresponds to no pattern. Of course, the control signals following the selection of the application remain sent and processed by it.

An advantage of this embodiment is that it enables to make a message using a communication protocol other than the VNP protocol usable.

According to still another embodiment, the host device external to the secure element, be this host virtual (virtual host) or in hardware form (device host), implements a (first) communication protocol into which messages according to another (second) protocol are converted if the secure element is not compatible with this second protocol.

Various embodiments and variants have been described. Those skilled in the art will understand that certain features of these various embodiments and variants may be combined, and other variants will occur to those skilled in the art.

Finally, the practical implementation of the described embodiments and variations is within the abilities of those skilled in the art based on the functional indications given hereinabove.

What is claimed is:

1. A secure element comprising:
   at least one operating system in the secure element, comprising an application, and configured to link the application to a register in the secure element;
   a buffer memory in the secure element, wherein the buffer memory is separate from the register; and
   a router in the secure element, the router having a software layer configured to:
      receive first messages intended for the application, using a first protocol compatible with a secure element protocol;
      process contents of and direct the first messages to the buffer memory in the secure element;

receive second messages intended for the application, using a second protocol different from the first protocol;

determine that the second protocol is incompatible with the secure element protocol; and after determining the second protocol is incompatible with the secure element protocol, pass through and direct the second messages to the register in the secure element.

2. The secure element according to claim 1, wherein the first protocol is implemented by a device external to the secure element.

3. The secure element according to claim 1, wherein the first protocol is a Virtual Network Protocol (VNP) protocol defined according to a Global Platform Technology-Virtual Primary Platform-Network Protocol 1.0.1 or subsequent standard.

4. The secure element according to claim 1, wherein the second protocol is selected from the group consisting of: a Host Controller Interface (HCI) protocol, a Single Wire Protocol (SWP) protocol, a Contactless Tunneling (CLT) protocol, a packet communication protocol defined by an International Organization for Standardization 7816 (ISO7816) standard, a simplified High-Level Data Link Control (sHDLC) protocol, or a communication protocol using an internal timing memory.

5. The secure element according to claim 1, wherein the first and second messages contain data packets of a packet communication method.

6. The secure element according to claim 1, wherein the second messages originate from a near-field communication device.

7. The secure element according to claim 1, wherein a high-level operating system of the secure element implements the application.

8. The secure element according to claim 7, wherein the secure element is configured to implement at least two applications.

9. The secure element according to claim 8, wherein the software layer is further configured to direct, via the register, the second messages to a selected application among the at least two applications for which the second messages are intended.

10. The secure element according to claim 9, wherein the software layer is configured to manage a list of patterns provided by the applications for routing the protocols.

11. The secure element according to claim 1, wherein the secure element is embedded in an electronic system.

12. The secure element according to claim 1, wherein the secure element is integrated in an electronic system.

13. A method of communication with an electronic device by a secure element comprising at least one operating system including an application having a register in the secure element, a buffer memory separate from the register, and a router associated therewith, the router implementing a software layer, the method comprising:

linking, by the secure element, the application with the register;

receiving, by the software layer in the secure element, first messages intended for the application, using a first protocol compatible with a secure element protocol;

processing contents of and directing, by the software layer in the secure element, the first messages to the buffer memory in the secure element;

receiving, by the software layer, second messages intended for the application, using a second protocol different from the first protocol;

determining, by the software layer in the secure element, that the second protocol is incompatible with the secure element protocol; and after determining the second protocol is incompatible with the secure element protocol, passing through and directing, by the software layer in the secure element, the second messages to the register in the secure element.

14. The method according to claim 13, wherein the first protocol is implemented by the electronic device, and the electronic device is external to the secure element.

15. The method according to claim 13, wherein the first protocol is a Virtual Network Protocol (VNP) protocol defined according to a Global Platform Technology-Virtual Primary Platform-Network Protocol 1.0.1 or subsequent standard.

16. The method according to claim 13, wherein the second protocol is selected from the group consisting of: a Host Controller Interface (HCI) protocol, a Single Wire Protocol (SWP) protocol, a Contactless Tunneling (CLT) protocol, a packet communication protocol defined by an International Organization for Standardization 7816 (ISO7816) standard, a simplified High-Level Data Link Control (sHDLC) protocol, or a communication protocol using an internal timing memory.

17. The method according to claim 13, wherein the first and second messages contain data packets of a packet communication method.

18. The method according to claim 13, wherein the second messages originate from a near-field communication device.

19. The method according to claim 13, wherein a high-level operating system of the secure element implements the application.

20. The method according to claim 19, wherein the secure element implements at least two applications.

21. The method according to claim 20, further comprising directing, by the software layer via the register, the second messages to a selected application among the at least two applications for which the second messages are intended.

22. The method according to claim 21, further comprising managing, by the software layer, a list of patterns provided by the applications for routing the protocols.

23. A system on a chip (SOC), comprising:

a communication bus on the SOC;

at least one processor on the SOC connected to the communication bus; and a secure element on the SOC connected to the communication bus, the secure element comprising:

at least one operating system comprising an application, and configured to link the application to a register in the secure element;

a buffer memory separate from the register; and a router having a software layer configured to:

receive first messages intended for the application, using a first protocol compatible with a secure element protocol;

process contents of and direct the first messages to the buffer memory;

receive second messages intended for the application, using a second protocol different from the first protocol;

determine that the second protocol is incompatible with the first protocol; and after determining the second protocol is incompatible with the secure element protocol, pass through and direct the second messages to the register.

24. The SOC according to claim 23, wherein:
the first protocol is a Virtual Network Protocol (VNP) protocol defined according to a Global Platform Technology-Virtual Primary Platform-Network Protocol 1.0.1 or subsequent standard; and
the second protocol is selected from the group consisting of: a Host Controller Interface (HCI) protocol, a Single Wire Protocol (SWP) protocol, a Contactless Tunneling (CLT) protocol, a packet communication protocol defined by an International Organization for Standardization 7816 (ISO7816) standard, a simplified High-Level Data Link Control (sHDLC) protocol, or a communication protocol using an internal timing memory.

* * * * *